(12) United States Patent
Dillard et al.

(10) Patent No.: US 9,658,998 B2
(45) Date of Patent: May 23, 2017

(54) SYSTEMS AND METHODS FOR INTERNATIONALIZATION AND LOCALIZATION

(75) Inventors: David Dillard, Phoenix, AZ (US); Smitha Sebastian, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 608 days.

(21) Appl. No.: 13/404,892

(22) Filed: Feb. 24, 2012

(65) Prior Publication Data
US 2013/0226554 A1 Aug. 29, 2013

(51) Int. Cl.
G06F 17/28 (2006.01)
G06F 17/00 (2006.01)
G06F 17/24 (2006.01)

(52) U.S. Cl.
CPC .......... *G06F 17/248* (2013.01); *G06F 17/289* (2013.01)

(58) Field of Classification Search
CPC .................................................. G06F 17/248
USPC .............................................................. 704/2
See application file for complete search history.

(56) References Cited

U.S. PATENT DOCUMENTS

| | | | | |
|---|---|---|---|---|
| 7,937,261 B2* | 5/2011 | Wang | ..................... | G06F 17/289 704/2 |
| 8,249,854 B2* | 8/2012 | Nikitin | ................... | G06F 17/289 704/2 |
| 8,635,059 B2* | 1/2014 | Estelle | ................... | G06F 17/277 704/2 |
| 2003/0154071 A1* | 8/2003 | Shreve | ................ | G06F 17/2845 704/9 |
| 2004/0167768 A1* | 8/2004 | Travieso | ............... | G06F 17/289 704/2 |
| 2005/0010475 A1* | 1/2005 | Perkowski | ............. | G06Q 30/02 705/14.51 |
| 2005/0138004 A1* | 6/2005 | Teplitsky | ............ | G06F 17/3089 |
| 2007/0233547 A1* | 10/2007 | Younger | ............... | G06F 17/248 705/7.14 |
| 2008/0120087 A1* | 5/2008 | Scanlan | ................ | G06F 17/289 704/2 |
| 2008/0127045 A1* | 5/2008 | Pratt | ..................... | G06F 9/4448 717/104 |
| 2008/0147378 A1* | 6/2008 | Hall | .................... | G06F 17/2827 704/4 |
| 2008/0288239 A1* | 11/2008 | Bailey | ................... | G06F 17/248 704/2 |
| 2009/0287471 A1* | 11/2009 | Bennett | ................. | G06F 17/275 704/3 |
| 2010/0241416 A1* | 9/2010 | Jiang | ...................... | G06F 17/28 704/7 |

(Continued)

*Primary Examiner* — David Hudspeth
*Assistant Examiner* — Timothy Nguyen
(74) *Attorney, Agent, or Firm* — Snell & Wilmer L.L.P.

(57) ABSTRACT

Webpage content is sent to a user's web browser in a neutral format. On the user's web browser the webpage content is translated by a transformation application into the appropriate language and locale. A Language template file that contains the internationalization and localization data and processing components is loaded onto a browser and is used by the transformation application to render the final data to the user. The transformation application can render a new language and locale by loading an appropriate language template file.

20 Claims, 12 Drawing Sheets

(56) References Cited

U.S. PATENT DOCUMENTS

| | | | |
|---|---|---|---|
| 2010/0250650 A1* | 9/2010 | Allen | G06F 8/76 |
| | | | 709/203 |
| 2010/0286977 A1* | 11/2010 | Chin | G06F 17/289 |
| | | | 704/4 |
| 2011/0082683 A1* | 4/2011 | Soricut | G06F 17/289 |
| | | | 704/2 |
| 2011/0191165 A1* | 8/2011 | Kiseli | G06Q 30/0246 |
| | | | 705/14.45 |
| 2011/0213684 A1* | 9/2011 | Tait | G06Q 20/10 |
| | | | 705/30 |
| 2012/0016865 A1* | 1/2012 | Travieso | G06F 17/2827 |
| | | | 707/711 |
| 2012/0017146 A1* | 1/2012 | Travieso | G06F 17/2827 |
| | | | 715/265 |
| 2013/0117657 A1* | 5/2013 | Verlaan | G06F 17/212 |
| | | | 715/234 |

\* cited by examiner

WWW.EXAMPLE.COM

THANK YOU FOR YOUR PAYMENT!

NEW BALANCE: $1,300.00
PAYMENT DATE: JAN 01, 2012

SPANISH    FRENCH

FIG. 8

<THANK YOU MESSAGE>

<NEW BALANCE> <CURRENCY VALUE = 1300.00>

<PAYMENT DATE><DATE VALUE = 1.1.2012>

[ SPANISH ]   [ FRENCH ]

FIG. 9

<THANK YOU MESSAGE> = "THANK YOU FOR YOUR PAYMENT!"

<NEW BALANCE> = "NEW BALANCE"

<CURRENCY VALUE> =

BEGINS WITH $
   SEPARATE 1000's WITH ","
   SEPARATE FRACTIONS WITH "."

<PAYMENT DATE> = "PAYMENT DATE"

<DATE VALUE>

DISPLAY MONTH FIRST USING THESE VALUES "JAN", "FEB", "MAR", "APR", "MAY", "JUN", "JUL", "AUG", "SEP",
     "OCT", "NOV", "DEC"
   DISPLAY DAY OF MONTH NEXT AS NUMBER
   DISPLAY YEAR AS 4 DIGIT NUMBER

FIG. 10

```
<THANK YOU MESSAGE> = "NOUS VOUS REMERCIONS DE VOTRE
PAIEMENT!"

<NEW BALANCE> = "NOUVEAU SOLDE"

<CURRENCY VALUE> =

SEPARATE 1000's WITH "."
   SEPARATE FRACTIONS WITH ","
   ENDS WITH $

<PAYMENT DATE> = "DATE DE PAIEMENT"

<DATE VALUE>

DISPLAY DAY OF MONTH FIRST AS NUMBER
   DISPLAY MONTH NEXT USING THESE VALUES "JANV.", "FEVR.", "MARS",
"AVR.", "MAI", "JUIN", "JUIL.", "AOUT",
   "SEPT.", "OCT.", "NOV.", "DEC."
   DISPLAY YEAR AS 4 DIGIT NUMBER
```

FIG. 11

SYSTEMS AND METHODS FOR INTERNATIONALIZATION AND LOCALIZATION

FIELD OF THE INVENTION

The disclosure generally relates to internationalization and localization of electronic data, and more specifically, to systems and methods for internationalization and localization processing on a web client.

BACKGROUND

Information stored on a database or server may need to be accessible in multiple formats. For example, users in one country may prefer the content to be displayed in their native language, while other users may prefer the content to be displayed in a different language. The conversion of information into the appropriate format is typically performed by the server prior to being delivered to a user's computer. Each time a user updates information on a webpage, the server may need to perform internationalization and localization in order to appropriately display the content.

However, as the number of internet users and the complexity of information transmitted across the interact continue to increase, the processing demands on servers increases as well. Increased processing demand results in higher costs to businesses and slower interaction for the user. Thus, a need exists for a method which performs internationalization and localization at a lower processing cost to a server.

SUMMARY

The present disclosure includes a system, method, and article of manufacture for translating data. The method may comprise determining a first language for a display, transmitting webpage content in a neutral format and transmitting a transformation application to a browser on a web client, wherein the transformation application translates page data comprising the webpage content and client information in response to the page data being transmitted to a browser. The method may comprise transmitting a first language template file comprising internationalization and localization information corresponding to the first language, and transmitting client information in response to a request from the transformation application. The language template file may be loaded in an inline frame on the browser. The transformation application may reference the language template file in order to translate the page data.

The method may further include transmitting updated client information, wherein the transformation application on the browser refers to the first language template file in order to translate the updated client information. The method may further include determining a second language for display. A second language template file may be transmitted to the browser and the transformation application may translate the webpage content by referring to the second language template file.

BRIEF DESCRIPTION OF THE DRAWINGS

The features and advantages of the present disclosure will become more apparent from the detailed description set forth below when taken in conjunction with the drawings. The left most digit of a reference number identifies the drawing in Which the reference number first appears.

FIG, 2 shows a flowchart depicting an exemplary process for performing internationalization and localization of data in accordance with various embodiments.

FIG, 3 shows a flowchart depicting an exemplary process for performing internationalization and localization of data in response to a language being changed in accordance with various embodiments.

FIG, 4 shows an example welcome screenshot in accordance with various embodiments.

Figure 5:
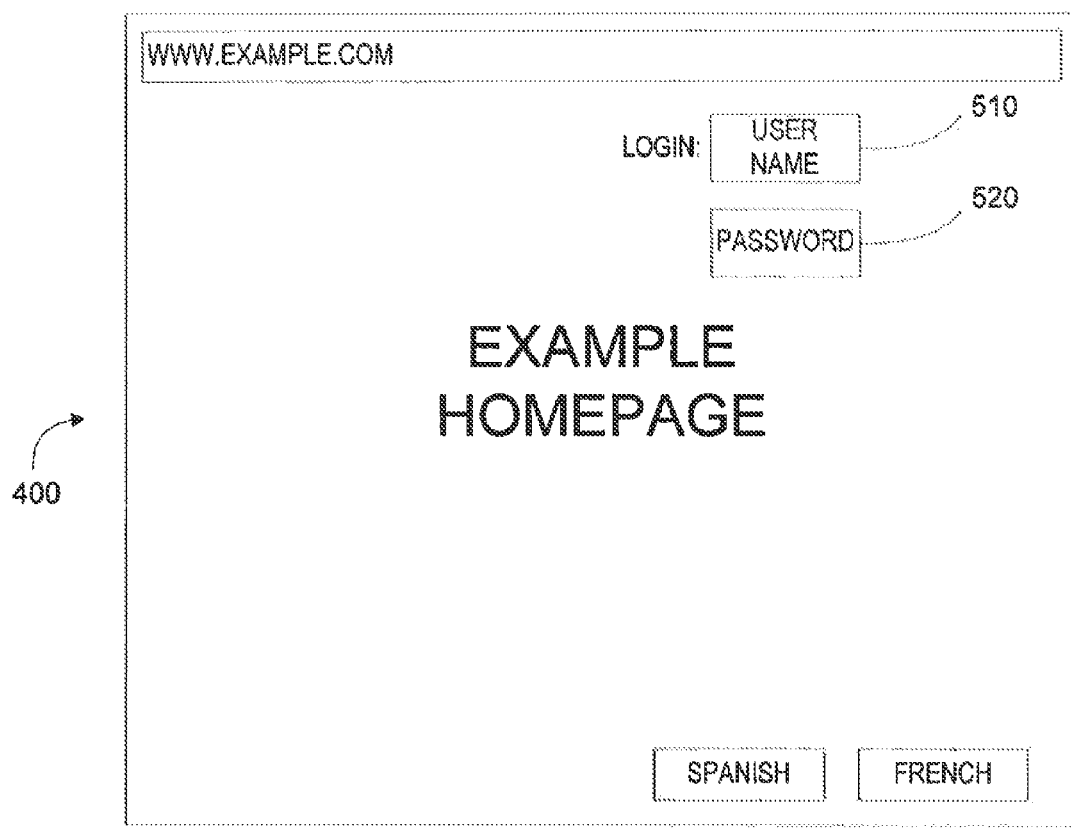

FIG. 5 shows an example homepage in accordance with various embodiments.

FIG, 6 shows an example account page in accordance with various embodiments.

FIG, 7 shows an example payment page in accordance with various embodiments.

FIG. 8 shows an example payment received page in accordance with various embodiments.

FIG, 9 shows an example web application information page in accordance with various embodiments.

FIG. 10 shows an example of an English language template file in accordance with various embodiments.

FIG. 11 shows an example of a French language template file in accordance with various embodiments.

FIG, 12 show an example payment received page in French in accordance with various embodiments.

DETAILED DESCRIPTION

Systems, methods, and articles of manufacture for performing internationalization and localization are disclosed. In general, a server may determine based on a user's location what language in which to display webpage information. However, the user may prefer a different language. For example, in countries where there are multiple major languages, such as Canada (French and English), the user may prefer an alternate language.

In response to a webpage being accessed, the server may load a transformation application and a language template file for use by the browser. In various embodiments, the language template file may be loaded into an inline frame (iFrame) in a browser on the user's computer. In response to the user moving between pages, the transformation application may use the language template the to format the data into the desired language and locale. In various embodiments, the browser may not communicate with the server in response to the user navigating between pages.

The user may transmit data to the server. For example, if a user inputs data representing a payment, the payment information may be transmitted to the server, the server may communicate with a mainframe and a database to process the payment information, and the server may transmit updated information to the user reflecting the payment. The updated information may be translated by the transformation application and language template file, which may have been previously loaded onto the user's system.

In various embodiments, a processor loads a transformation application onto a browser. The processor may also load a language template file corresponding to a preferred language and locale into an iFrame on the browser. The processor may load webpage content onto the browser in a neutral format, and the transformation application may request client information from a server. The processor uses the transformation application to translate the webpage content and client information into the preferred language and locale. The transformation application may refer to the language template file in order to perform the translating, By translating webpage content and client information using an application on the browser, processing demands of the server may be decreased. Regardless of which language the user wishes to be displayed, a language template file may only need to be transmitted from the server to the user's computer one time for each language. The server is not required to perform the translating, as this processing is delegated to the transformation application on the browser.

Additionally, the development of multi-language multi-locale applications is facilitated. To create a new language or locale, only the language template file has to be translated. Thus, the web applications and webpage content do not need to be reprogrammed in order to be used in another location.

Figure 1:
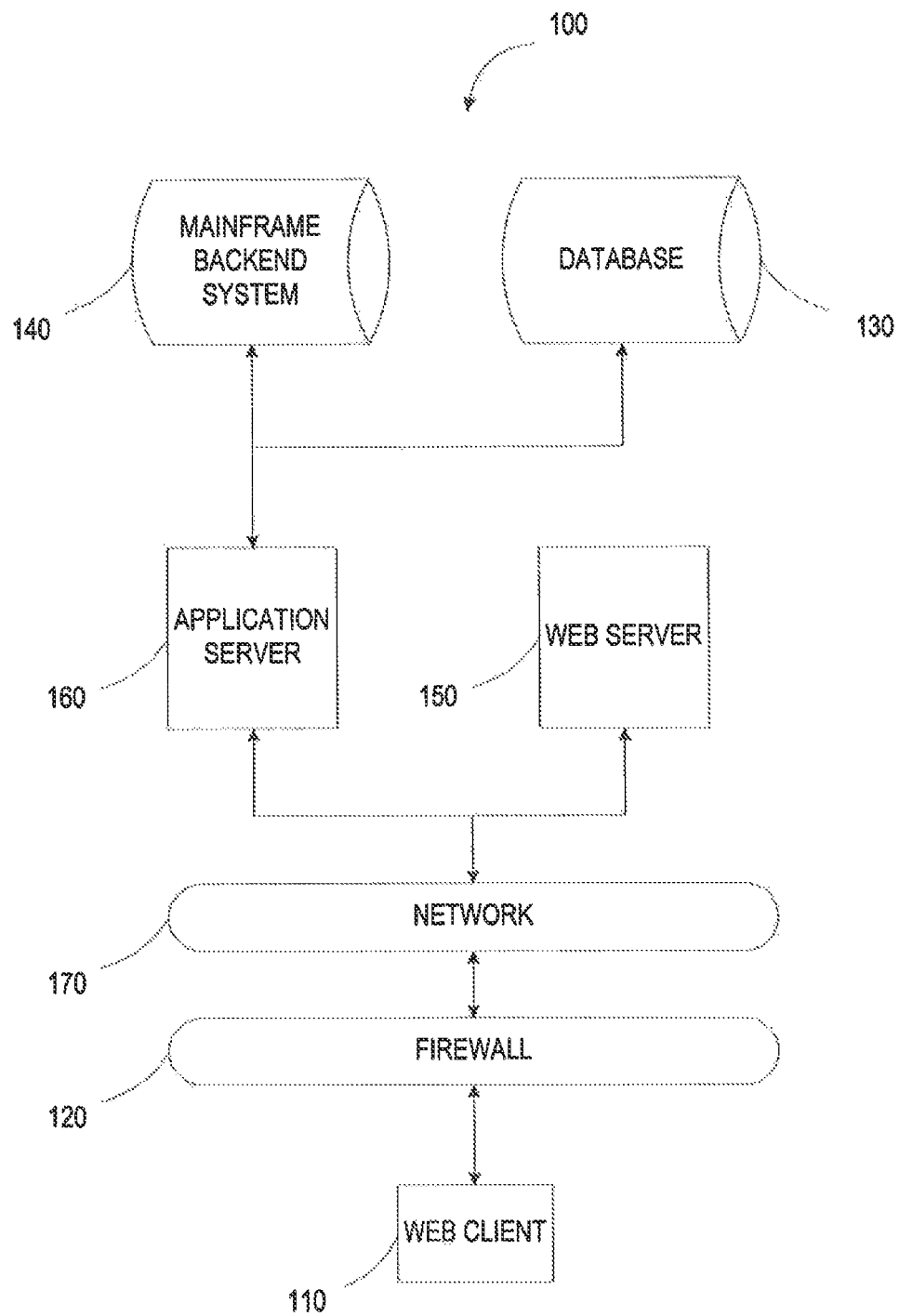
FIG. 1 shows an exemplary system diagram in accordance with various embodiments.

Referring now to FIG. 1, an exemplary system 100 for internationalization and localization is disclosed. System 100 may comprise a web client 110, a firewall 120, a database 130 and a mainframe 140, a web server 150, and an application server 160. Various system components may be connected through a network 170.

A web client 110 includes any device (e.g., personal computer) Which communicates via any network, for example such as those discussed herein. The web client 110 may comprise a browser application. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that the web client 110 may or may not be in direct contact with a web server 150 or an application server 160. For example, the web client may access the services of the web server 150 or the application server 160 through another server and/or hardware component, which may have a direct or indirect connection to an Internet server. For example, the web client 110 may communicate with the application server 160 via a load balancer. In an exemplary embodiment, access is through a network or the Internet through a commercially-available web-browser software package.

As those skilled in the art will appreciate, the web client 110 may include an operating system (e.g., Windows NT, 95/98/2000/CE/Mobile, OS2, UNIX, Linux, Solaris, MacOS, PalmOS, etc.) as well as various conventional support software and drivers typically associated with computers. The web client 110 may include any suitable personal computer, network computer, workstation, personal digital assistant, cellular phone, smart phone, minicomputer, mainframe or the like. The web client 110 can be in a home or business environment with access to a network. In an exemplary embodiment, access is through a network or the Internet through a commercially available web-browser software package. The web client 110 may implement security protocols such as Secure Sockets Layer (SSL) and Transport Layer Security (TLS). A web client may implement several application layer protocols including http, https, ftp, and sftp.

The computing unit of the web client 110 may be further equipped with an Internet browser connected to the Internet or an intranet using standard dial-up, cable, DSL or any other Internet protocol known in the art. Transactions originating at the web client 110 may pass through a firewall 120 in order to prevent unauthorized access from users of other networks. Further, additional firewalls may be deployed between the varying components of the system to further enhance security.

The firewall 120 may include any hardware and/or software suitably configured to protect system components and/or enterprise computing resources from users of other networks. Further, the firewall 120 may be configured to limit or restrict access to various systems and components behind the firewall 120 for web clients connecting through a web server. The firewall 120 may reside in varying configurations including Stateful Inspection, Proxy based, access control lists, and Packet Filtering among others. The firewall 120 may be integrated within a web server or any other system components or may further reside as a separate entity. The firewall 120 may implement network address translation ("NAT") and/or network address port translation ("NAPT"). The firewall 120 may accommodate various tunneling protocols to facilitate secure communications, such as those used in virtual private networking. The firewall 120 may implement a demilitarized zone ("DMZ") to facilitate communications with a public network such as the Internet. The firewall 120 may be integrated as software within an Internet server, any other application server components or may reside within another computing device or may take the form of a standalone hardware component.

Various system components may communicate via network 170. As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network 170 via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

Database 130 may include a single database or a plurality of databases. Various databases used herein may include: client data; merchant data; financial institution data; and/or like data useful in the operation of the system. Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure.

Mainframe 140 may include a powerful computer comprising a combination of hardware and/or software for processing and storing data. Mainframe 140 may be capable of a large amount of throughput. Mainframe 140 may run multiple operating systems and host multiple virtual machines. Mainframe may communicate directly or indirectly with application server 160 and database 130 in order to update the database 130.

Web server 150 and application server 160 may include any combination of hardware and/or software capable of transmitting and/or storing data. In the illustrated embodiment, web server 150 and application server 160 are shown as separate components. However, in various embodiments web server 150 and application server 160 may be a single server or a combination of any number of servers. In various embodiments application server 160 may be capable of transmitting dynamic and/or static webpage content, and web server 150 may be capable of transmitting a transformation application and language template files. As used herein, "the server" may refer to a single server or a combination of the web server 150 and the application server 160, or any combination of multiple servers. In various embodiments, the server may include common application servers (e.g. WEB SPHERE, WEB LOGIC, MOSS). In various embodiments, the server may include web servers (e.g. APACHE, IIS, GWS, SUN JAVA SYSTEM WEB SERVER).

Referring now to FIGS. 2-8, the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in 2-8, but also to the various system components as described above with reference to FIG. 1.

Figure 2:
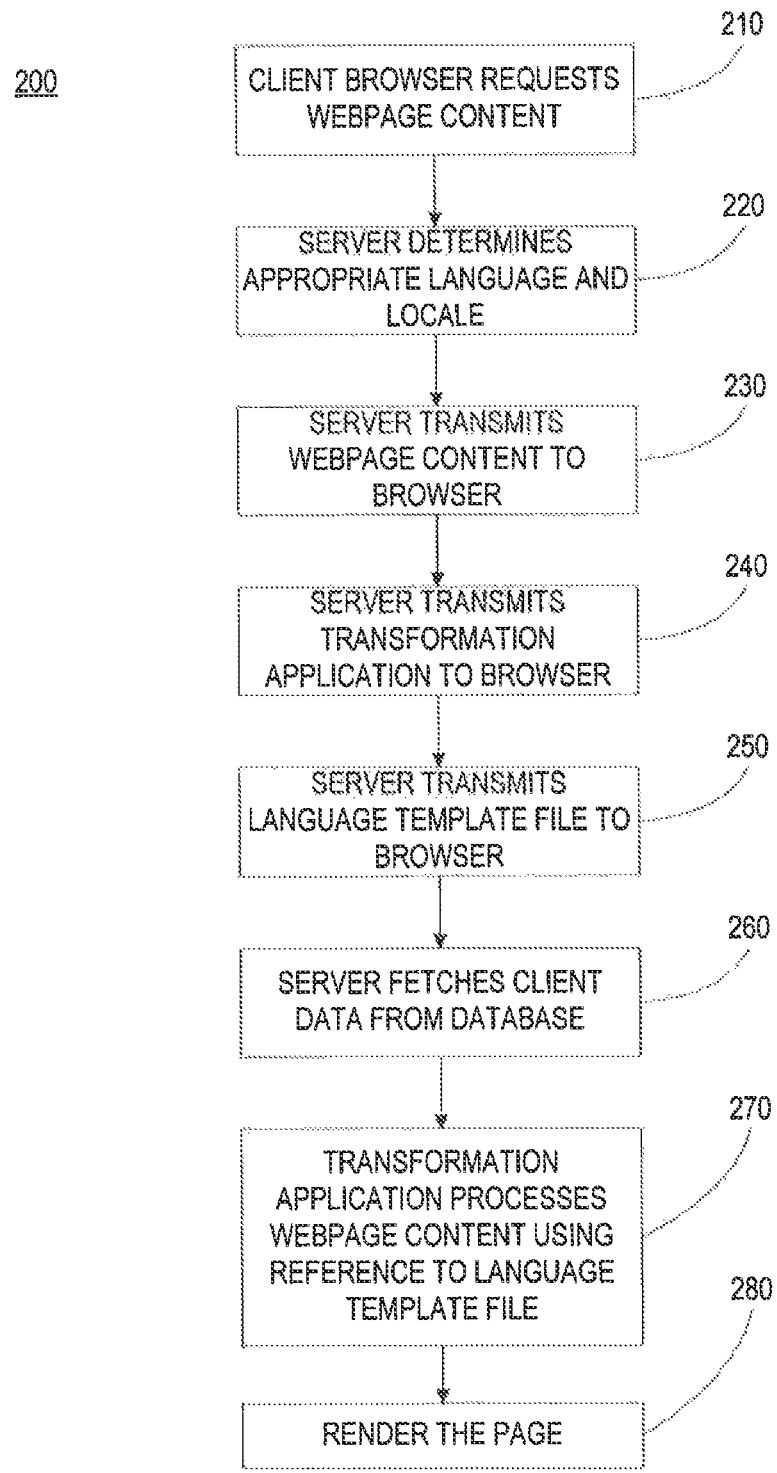

With reference to FIG. 2, a process 200 for internationalization and localization is disclosed. A user opens a web browser on the web client and accesses a website. The user may type in a URL, click on a link, or indicate a desired website by any other method. The browser may transmit a request for webpage content to a server 210.

The server determines the appropriate language and locale for display to the user 220. In various embodiments, the server may determine the appropriate language and locale automatically without receiving user input. The server may select the most likely preferred language and locale based on any of a number of factors, including a user's location or IP address, if the user prefers a different language or locale, the user may indicate as such, and the server may transmit content corresponding to the user's preference.

However, in various embodiments, the server may not determine the appropriate language and locale until in response to receiving input from the user. For example, in response to a user requesting access to a web page, the server may transmit content to the browser such that the browser display requests that the user select a language. The user's selection is transmitted to the server, and the server transmits the content corresponding to the user's preference.

In various embodiments, the server transmits webpage content to the browser 230. The webpage content may comprise static content, dynamic content, or a combination of the two. The webpage content may comprise a web application. The web application may comprise data that allows a user to navigate between multiple screens without communicating with the server. In various embodiments, the web application comprises a financial account web application. The financial account web application may allow a user to interact with various aspects of a financial account, such as balance information, transaction history, and scheduling payments. In various embodiments, the webpage content may be transmitted in a neutral format. The internationalization and localization is performed in response to the webpage content being transmitted to the browser in order to be displayed correctly. In various embodiments, because processing of the webpage content occurs on the browser, the server may only need to perform minimal or no processing of the webpage content.

In various embodiments, the server may transmit a transformation application to the browser 240. The transformation application may be coded in any programming language, including JavaScript. The transformation application or web application may obtain client information from the user (e.g., a user name and password corresponding to an account), and the transformation application or web application may request client data from the server.

The client data may be fetched from a database by the server 250. The client data may comprise a variety of information. For example, the client data may be particular to the user, such as financial account information, email communications, or any data that requires a user name and/or password to be accessed. In various embodiments, the transmitted client data is publicly accessible data, such as electronic newspaper content or streaming video. The client data may be transmitted in any format. In various embodiments, the client data is transmitted in a neutral format such that internationalization and localization may be performed in response to the client data being transmitted to the browser in order to be displayed correctly. In various embodiments, because processing of the client data occurs on the browser, the server may only need to perform minimal or no processing of the client data.

The transformation application is configured to process the data according to the specifications of a language template file. In response to receiving an instruction to render data, the transformation application checks for the appropriate language template file on the browser. If the transformation application does not detect the appropriate language template tile, the transformation application may transmit a request to the server for the appropriate language template file.

The transformation application may also check for an appropriate web application on the browser. If the appropriate web application is not loaded, the transformation application may request the web application from the server and load the web application on the browser. An example of a web application may be a payment function application which allows a user to make payments to a transaction account.

In various embodiments the language template file may be static HTML. The language template file may be loaded into an inline frame (iFrame) on the browser and contain data and/or instructions necessary for translating the webpage content into the appropriate language for display to the user. In various embodiments the server may transmit multiple language template files which may be stored simultaneously on the browser.

The language template file may also perform localization of the data. Localization may allow the data to be displayed using appropriate locale-specific components. For example, localization may cause the data to be displayed in the appropriate time/date format and currency. Localization may further include the appropriate writing direction (right-to-left, left-to-right, vertical), different systems of numerals, enablement of keyboard shortcuts, subtitling of video, cultural images, time zones, disputed borders on maps, address formats, dialects within a language, differing laws, customs, and many other locale-specific requirements. The webpage content, client data, language template file, and transformation application may be transmitted to the browser simultaneously, or in any order combination.

The transformation application processes page data which may comprise the webpage content and/or the client data 260. In order to properly display the page data, the transformation application refers to the appropriate language template file on the browser in response to processing the page data. The page data is rendered in the appropriate language and locale such that the user may interact with the page data 270. In various embodiments the processing is performed on the web client 110.

Figure 3:
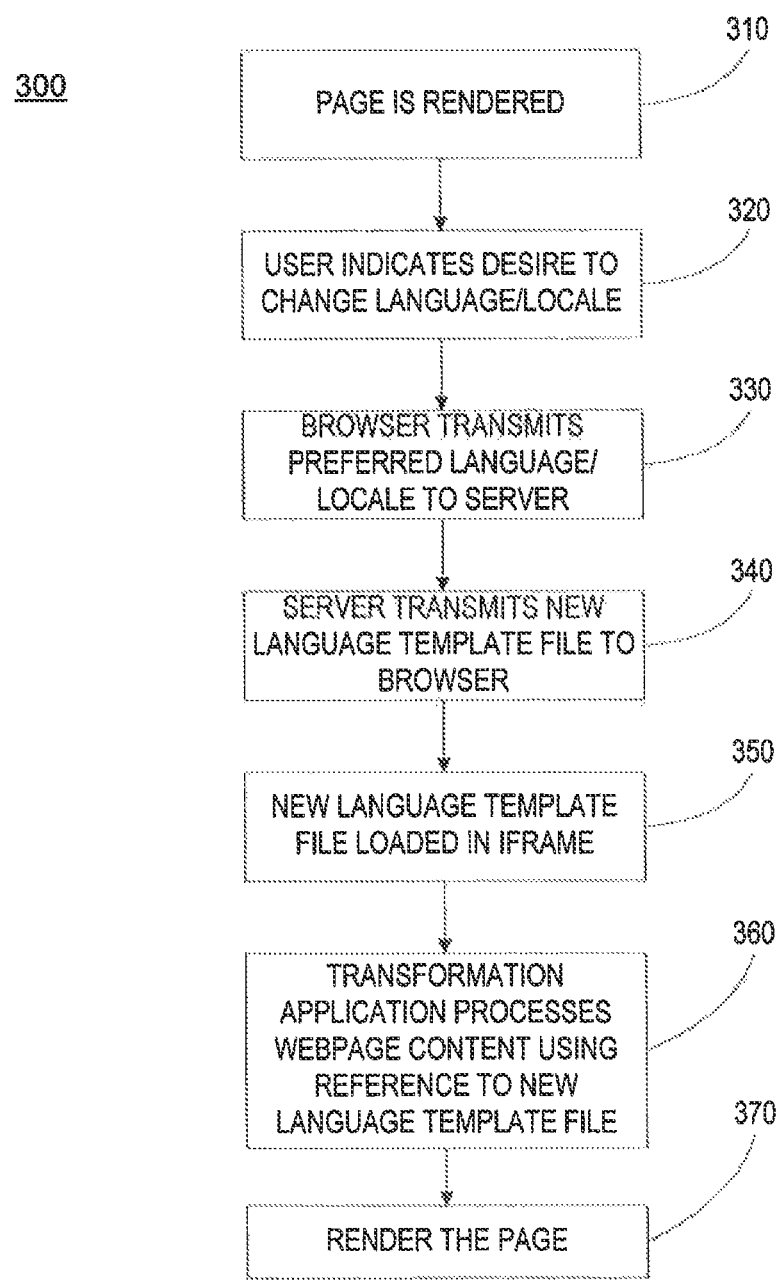

Referring to FIG. 3, a process for changing the language of page data on a webpage 300 is disclosed. A browser may render page data 310. The browser may have already loaded a transformation application, language template file, web application, and/or client data. The browser may be rendering the display in a first language. However, the user may indicate a desire to change the language or locale 320. The user may indicate this desire in any manner, including selecting a button or typing in the desired language. The browser may transmit the request to the server 330. In response to receiving the request, the server may transmit a new language template file corresponding to the desired language to the browser 340. The new language template file may be loaded into an name on the browser 350. Because the webpage content, web application, transformation application, and client data are already loaded on the browser, the server may not need to resend this information. The transformation application processes the data by referring to the new language template file 360. The browser may then render the page in the user's desired language and locale 370.

Figure 4:
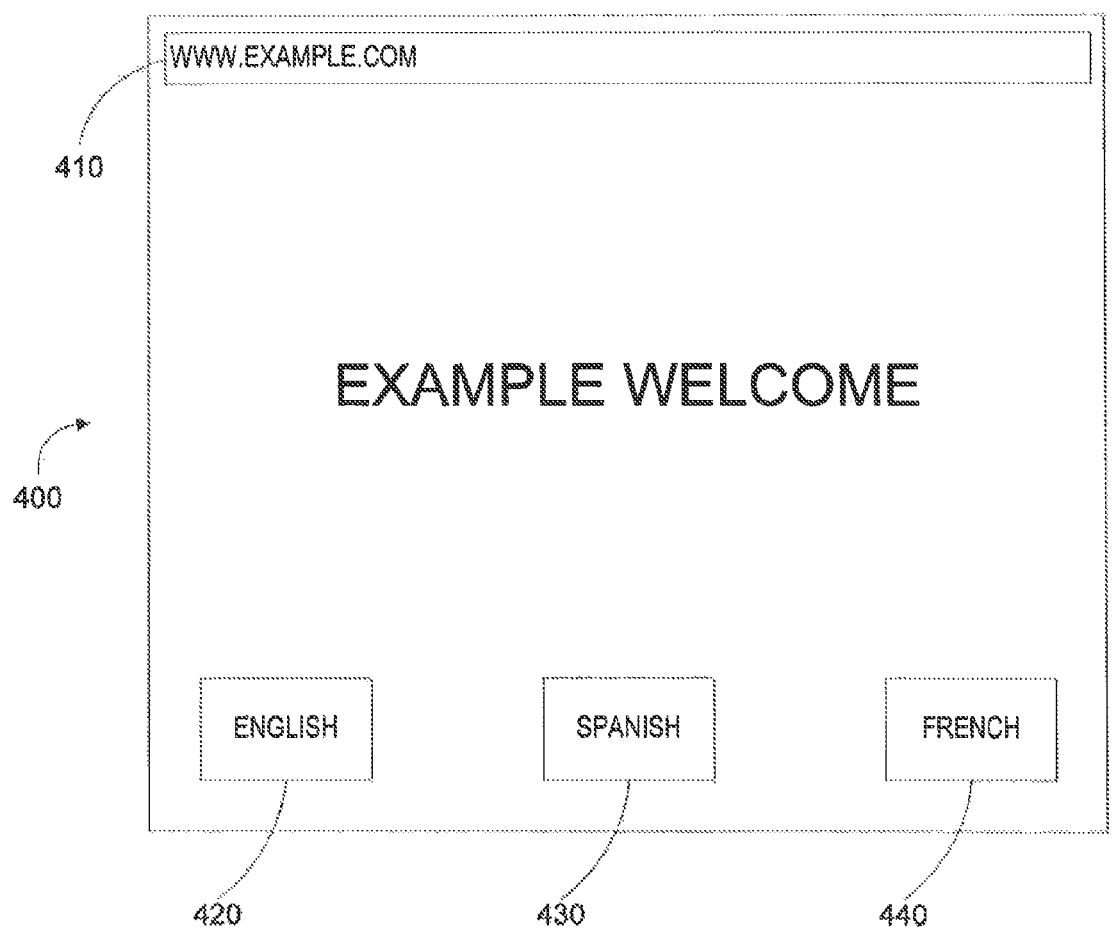

Referring now to FIG. 4, a URL 410 is entered into a browser 400 (e.g., typed by a user). The browser 400 transmits a request for data to a server. The server transmits a language preference request to the browser. In various embodiments, the browser 400 displays objects labeled "English," 420 "Spanish," 430 and "French" 440. The user selects the "English" 420 object, and the selection is transmitted to the server. The server then transmits an English language template file into an iFrame on the browser. In various embodiments, the iFrame may be transparent to the user. The server may also transmit webpage content in a neutral format and a JavaScript transformation application to the browser. The transformation application processes the webpage content by referencing the language template file and renders the data as shown in FIG. 5.

In FIG. 5, a homepage for the website is displayed. The homepage contains fields for a user name 510 and password 520 which allow access to the user's financial account. The user inputs their user name and password, and the information is transmitted to the server. The server fetches client data from a database, and transmits the client data and a financial web application to the browser 400.

Figure 6:
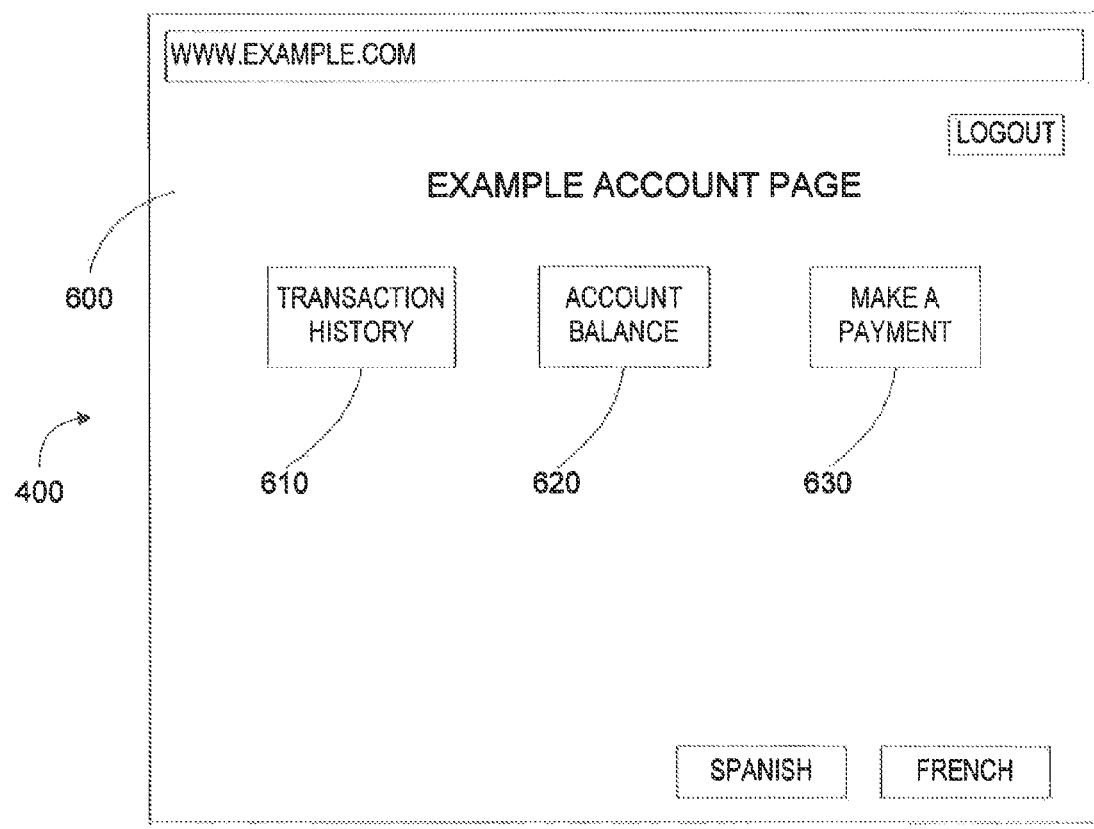
Figure 7:
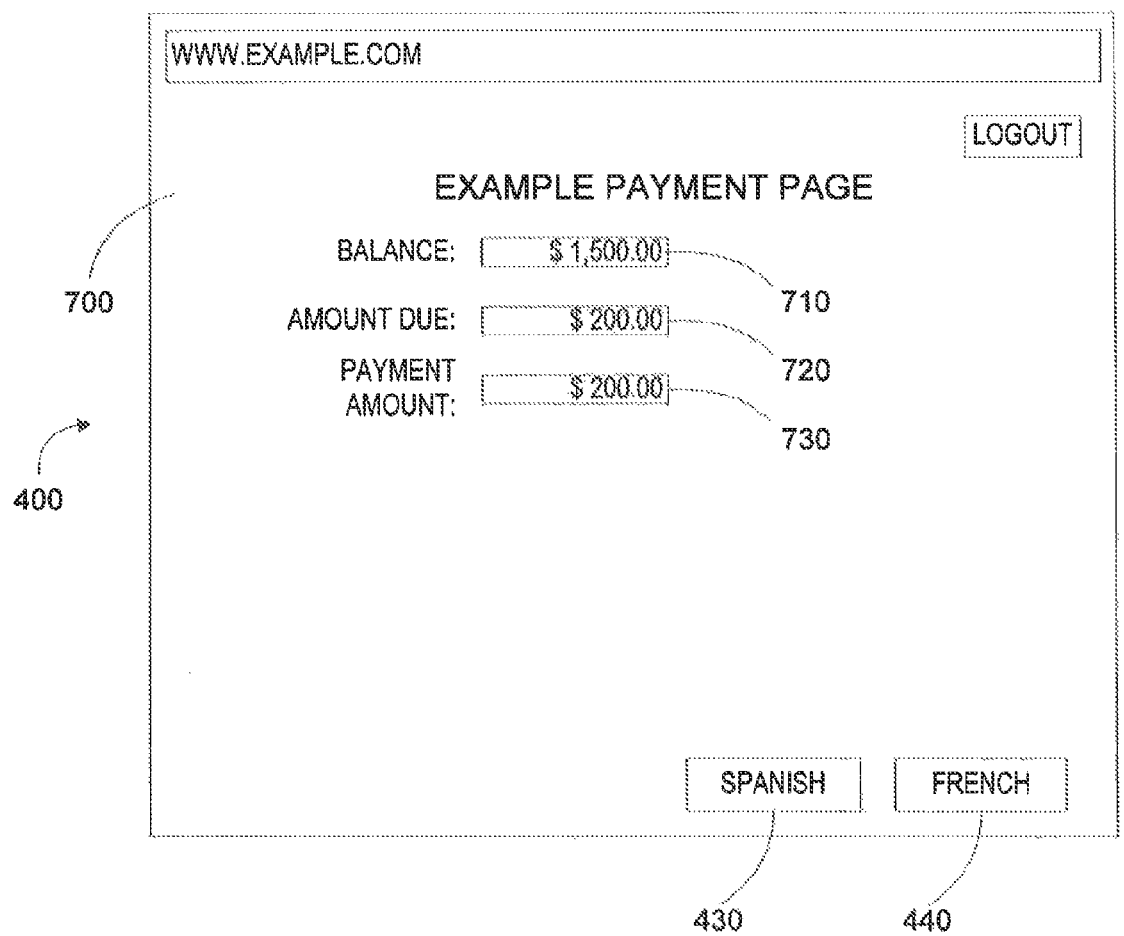

Referring to FIG. 6, the transformation application processes the client data and webpage content by referencing the language template file and renders the data to display the user's account information page 600. On this page, a number of options may be available to the user, including for example, "Transaction history," 610 "Account balance," 620 and/or "Make a payment" 630. If the user selects "Make a payment" 630, the transformation application processes the client data and webpage content by referencing the language template file and renders the data to display the payment page. Because the financial web application was already loaded on the browser 400, the browser may not need to communicate with the server in order to change the display to the payment page.

Referring to FIG, 7, the payment page 700 is displayed. Towards the bottom of the payment page, objects labeled "Spanish" 430 and "French" 440 may be displayed. If the user selects the "Spanish" 430 object, the browser 400 may transmit the selection to the server. In response, the server may transmit the Spanish language template file into an iFrame on the browser 400. This may or may not be the same iFrame that contains the English language template file. The transformation application processes the webpage data that is already on the browser by accessing the Spanish language template file and renders the data for display to the user in Spanish. Thus, there is no need for the server to process the data or reseed the webpage content to the browser 400. As the user navigates between web pages or transmits data to the server, the server may transmit data to the browser 400 in the same or similar neutral format as when the information was being displayed in English. Because the Spanish language template is loaded on the browser, the transformation application may reference the Spanish language template file to convert the information into Spanish, without the need for the server to translate the information, if the user then switches back to English by selecting the "English" object, the transformation application may render the data in English by referring to the English template file which is still on the browser 400.

The user may input information into an input field. The information may be of any type, but in various embodiments, the information may be a payment of a transaction account balance. The balance field 710 and the amount due field 720 display information specific to the user regarding the user's transaction account. In the illustrated embodiment, the transaction account has a balance of $1500.00 and the amount due is $200.00. The user inputs a payment amount, in this case $200.00, into the payment amount input field 730. The information is transmitted to the server, and the server may transmit updated information to the browser. Because the language template file has previously been loaded on the browser, the server does not need to translate the updated data into English. Instead, the updated data is transmitted to the browser, where the transformation application refers to the previously loaded language template file and translates the updated data into English and displays the content for the user as shown in FIG. 8.

Referring to FIG. 9, an example web application information page is shown according to various embodiments. The web application information page may include fields such as "Thank You Message" and "New Balance". The transformation application may use the language template file to display the appropriate language and behavior of the data values according to the web application information page.

Referring to FIG. 10, an example of an English language template file is shown in accordance with various embodiments. The English language template file may contain internationalization or localization rules that the web application may follow when processing data. For example, the Currency Value field may contain the rule "Begins with $". Thus, in FIG. 8, the value in the Currency Value field begins with $: "$1,300.00".

Figure 12:
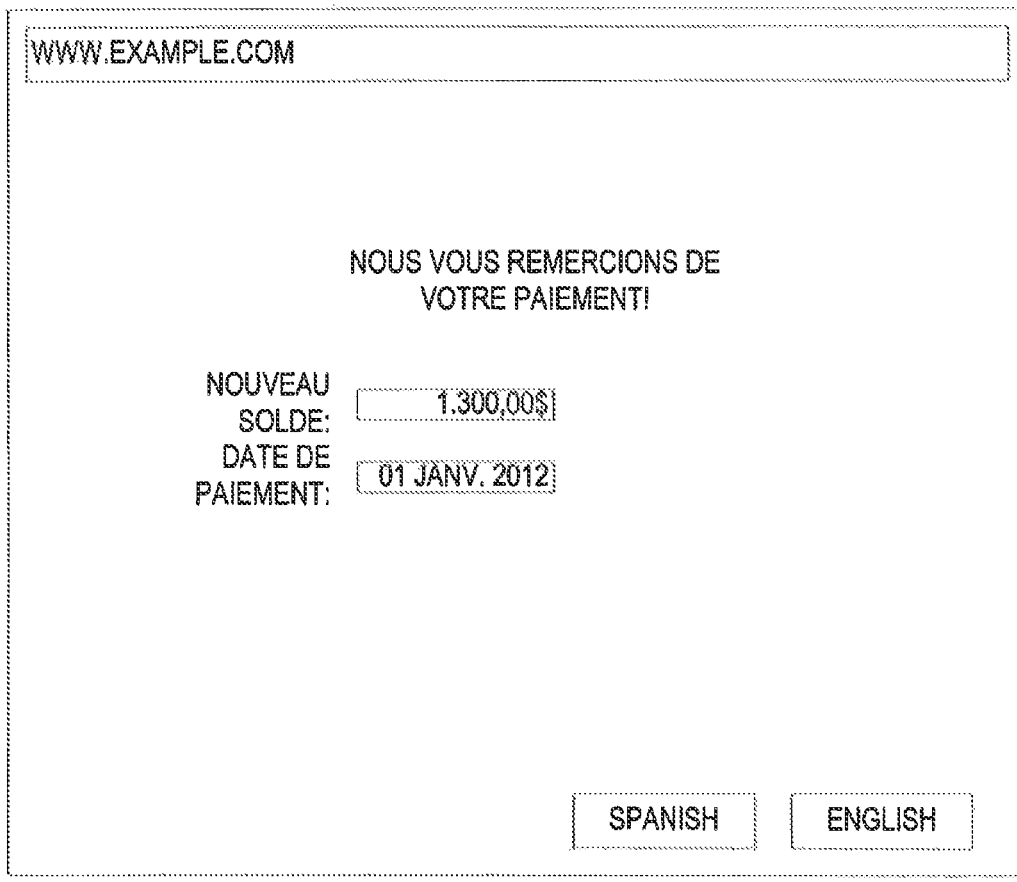

Referring to FIG. 11, an example of a French language template file is shown according to various embodiments. In response to a user selecting the French button in FIG. 8, the transformation application may send a request to the server for the French language template file. The transformation may then use the French language template file of FIG. 11 and the web application information file of FIG. 9 to render the display in French. Because the web application information file may be the same file regardless of the language, the transformation application may not need to load a new web application file from the server. The display may be rendered appropriately in French as shown in FIG. 12.

The detailed description of exemplary embodiments herein makes reference to the accompanying drawings and pictures, which show the exemplary embodiment by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the described particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/LEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify,or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments application servers such as Web Sphere, Web Logic, JBoss, etc., may be used. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code in C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank, in an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means Which implement the function specified in the flowchart Hock or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to an "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to he authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction. vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more," Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C, 112, sixth paragraph, unless the element is expressly recited using the phrase "means for," As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method comprising:
   determining, by a computer-based system, a first language for a display;

transmitting, by the computer-based system and to a web client, webpage content for a first webpage in a neutral format;

transmitting, by the computer-based system and to the web client, a transformation application, wherein the transformation application is configured to process the webpage content for the first webpage on the web client;

transmitting, by the computer-based system and to the web client, a first language template file corresponding to the first language, wherein the first language template file comprises static HTML, wherein the web client loads the first language template file into an inline frame of a web browser, and wherein the transformation application translates the webpage content for the first webpage from the neutral format into the first language at the web client by referring to the first language template file in the inline frame;

transmitting, by the computer-based system, to the web client and in response to a request from the transformation application, client information, wherein the transformation application translates the client information from the neutral format into the first language at the web client by referring to the first language template file;

transmitting, by the computer-based system and in response to a request for webpage content for a second webpage, the webpage content for the second webpage to the web client in the neutral format, wherein the transformation application translates the webpage content for the second webpage from the neutral format into the first language at the web client by referring to the first language template file;

wherein the web client displays the webpage content for the second webpage in the first language;

receiving, by the computer-based system, a request to display the webpage content for the second webpage in a second language; and transmitting, by the computer-based system, a second language template file to the web client, wherein the web client translates the webpage content for the second webpage from the neutral format into the second language at the web client by referring to the second language template file, wherein the web client displays the webpage content for the second webpage in the second language.

2. The method of claim 1, further comprising translating, by the computer-based system and using the first language template file, page data comprising at least one of the webpage content for the first webpage or the client information into the first language.

3. The method of claim 1, further comprising loading, by the computer-based system, the second language template into the inline frame on the browser.

4. The method of claim 1, further comprising transmitting, by the computer-based system, HTML and JavaScript to a browser.

5. The method of claim 1, wherein the first language template file comprises internationalization and localization information.

6. The method of claim 1, further comprising requesting, by the computer-based system, information identifying the first language.

7. The method of claim 1, wherein the transformation application translates page data comprising at least one of the webpage content for the first webpage or the client information in response to the page data being transmitted to a browser.

8. The method of claim 1, further comprising rendering, by the computer-based system and using the transformation application, the data in the preferred language.

9. The method of claim 8, wherein the transformation application references the first language template file to perform the rendering.

10. The method of claim 1, further comprising transmitting, by the computer-based system, updated client information.

11. The method of claim 10, further comprising translating, by the computer-based system and using the first language template, the updated client information into the first language.

12. The method of claim 10, further comprising:
translating, by the computer-based system and using the transformation application, the updated client information into the first language, wherein the transformation application refers to the first language template file to perform the translating.

13. The method of claim 1, further comprising, determining, by the computer-based system, a second language for display.

14. The method of claim 13, wherein the second language template file corresponds to the second language.

15. The method of claim 14, further comprising translating, by the computer-based system, the webpage content for the first webpage into the second language.

16. The method of claim 15, wherein the transformation application references the second language template file in order to perform the translating.

17. The method of claim 1, further comprising translating, by the computer-based system and on the web client, at least one of the webpage content for the first webpage or the client information into the first language.

18. The method of claim 17, wherein the transformation application refers to the first language template file in order to perform the translating, and wherein the web client does not communicate with the server during the translating.

19. A system comprising:
a processor,
a tangible, non-transitory memory configured to communicate with the processor,
the tangible, non-transitory memory having instructions stored thereon that, in response to execution by the processor, cause the processor to perform operations comprising:
loading, by the processor, a transformation application onto a browser,
wherein the transformation application is configured to process webpage content on the browser;
loading, by the processor, a first language template file corresponding to a preferred language and locale into an inline frame on the browser,
wherein the first language template file comprises static HTML;
loading, by the processor, the first language template file into an inline frame of a web browser;
receiving, by the processor, webpage content for the first webpage in a neutral format;
requesting, by the processor and using the transformation application, client information;
translating, by the processor and using the transformation application, the webpage content for the first webpage and the client information from the neutral format into the preferred language on the browser, wherein the transformation application refers to the first language template file in the inline frame in order to perform the translating;

receiving, by the processor and in response to a request for webpage content for a second webpage, the webpage content for the second webpage in the neutral format, wherein the transformation application translates the webpage content for the second webpage from the neutral format into the preferred language by referring to the first language template file;

displaying, by the processer, the webpage content for the second webpage in the first language;

loading, by the processor, a second language template file corresponding to a secondary language;

translating, by the processor and using the transformation application, the webpage content for the second webpage from the neutral format into the secondary language by referring to the second language template file; and displaying, by the processor, the webpage content for the second webpage in the second language.

20. An article of manufacture including a non-transitory, tangible computer readable storage medium having instructions stored thereon that, in response to execution by a computer-based system, cause the computer-based system to perform operations comprising:

determining, by the computer-based system, a first language for a display;

transmitting, by the computer-based system and to a web client, webpage content in a neutral format;

transmitting, by the computer-based system and to the web client, a transformation application, wherein the transformation application is configured to process the webpage content on the web client;

transmitting, by the computer-based system and to the web client, a first language template file corresponding to the first language, wherein the first language template file comprises static HTML, wherein the web client loads the first language template file into an inline frame of a web browser, and wherein the transformation application translates the webpage content into the first language at the web client by referring to the first language template file in the inline frame;

transmitting, by the computer-based system, to the web client and in response to a request from the transformation application, client information, wherein the transformation application translates the client information from the neutral format into the first language at the web client by referring to the first language template file;

transmitting, by the computer-based system and in response to a request for webpage content for a second webpage, the webpage content for the second webpage to the web client in the neutral format, wherein the transformation application translates the webpage content for the second webpage from the neutral format into the first language at the web client by referring to the first language template file;

wherein the web client displays the webpage content for the second webpage in the first language;

receiving, by the computer-based system, a request to display the webpage content for the second webpage in a second language; and transmitting, by the computer-based system, a second language template file to the web client, wherein the web client translates the webpage content for the second webpage from the neutral format into the second language at the web client by referring to the second language template file, wherein the web client displays the webpage content for the second webpage in the second language.

\* \* \* \* \*